United States Patent
Truesdale et al.

(10) Patent No.: US 8,353,611 B2
(45) Date of Patent: Jan. 15, 2013

(54) FASTENER WITH ILLUMINATOR

(75) Inventors: Brian J. Truesdale, Wauconda, IL (US);
David F. Schieleit, Chicago, IL (US);
Kenneth A. Albrecht, Zion, IL (US);
YuJen Lo, Kaohsiung (TW); YuHsun Wu, Kaohsiung (TW)

(73) Assignee: ITW Electronic Business Asia Co. Ltd., Kaohsiung (TW)

( * ) Notice: Subject to any disclaimer, the term of this patent is extended or adjusted under 35 U.S.C. 154(b) by 264 days.

(21) Appl. No.: 12/718,773

(22) Filed: Mar. 5, 2010

(65) Prior Publication Data

US 2010/0220495 A1 Sep. 2, 2010

Related U.S. Application Data

(63) Continuation-in-part of application No. 12/258,528, filed on Oct. 27, 2008, now abandoned.

(30) Foreign Application Priority Data

Nov. 7, 2007 (TW) .............................. 96218757 U

(51) Int. Cl.
*F21V 7/04* (2006.01)

(52) U.S. Cl. .......................... 362/549; 362/289; 362/650

(58) Field of Classification Search .................. 362/606, 362/612, 230, 231, 601, 625, 429, 368, 289, 362/164, 155, 549, 650
See application file for complete search history.

(56) References Cited

U.S. PATENT DOCUMENTS

| | | |
|---|---|---|
| 4,290,092 A | 9/1981 | Bull |
| 4,992,704 A | 2/1991 | Stinson |
| 5,030,811 A * | 7/1991 | von Gaisberg et al. ....... 362/489 |
| 6,612,725 B2 | 9/2003 | Camarota et al. |
| 7,025,477 B2 | 4/2006 | Blessing et al. |
| 7,040,776 B2 | 5/2006 | Harrell et al. |
| 7,549,773 B2 | 6/2009 | Lim |
| 2007/0193867 A1 * | 8/2007 | Lorenzo Riera et al. ..... 200/314 |

* cited by examiner

*Primary Examiner* — Julie Shallenberger

(74) *Attorney, Agent, or Firm* — Lowe Hauptman Ham & Berner LLP

(57) ABSTRACT

A fastener includes a main body having a front portion and a rear portion, a securing member engageable with the rear portion of the main body, and a light source unit securable between the securing member and the front portion of the main body, for providing light to illuminate the front portion of the main body.

21 Claims, 10 Drawing Sheets

FIG.5

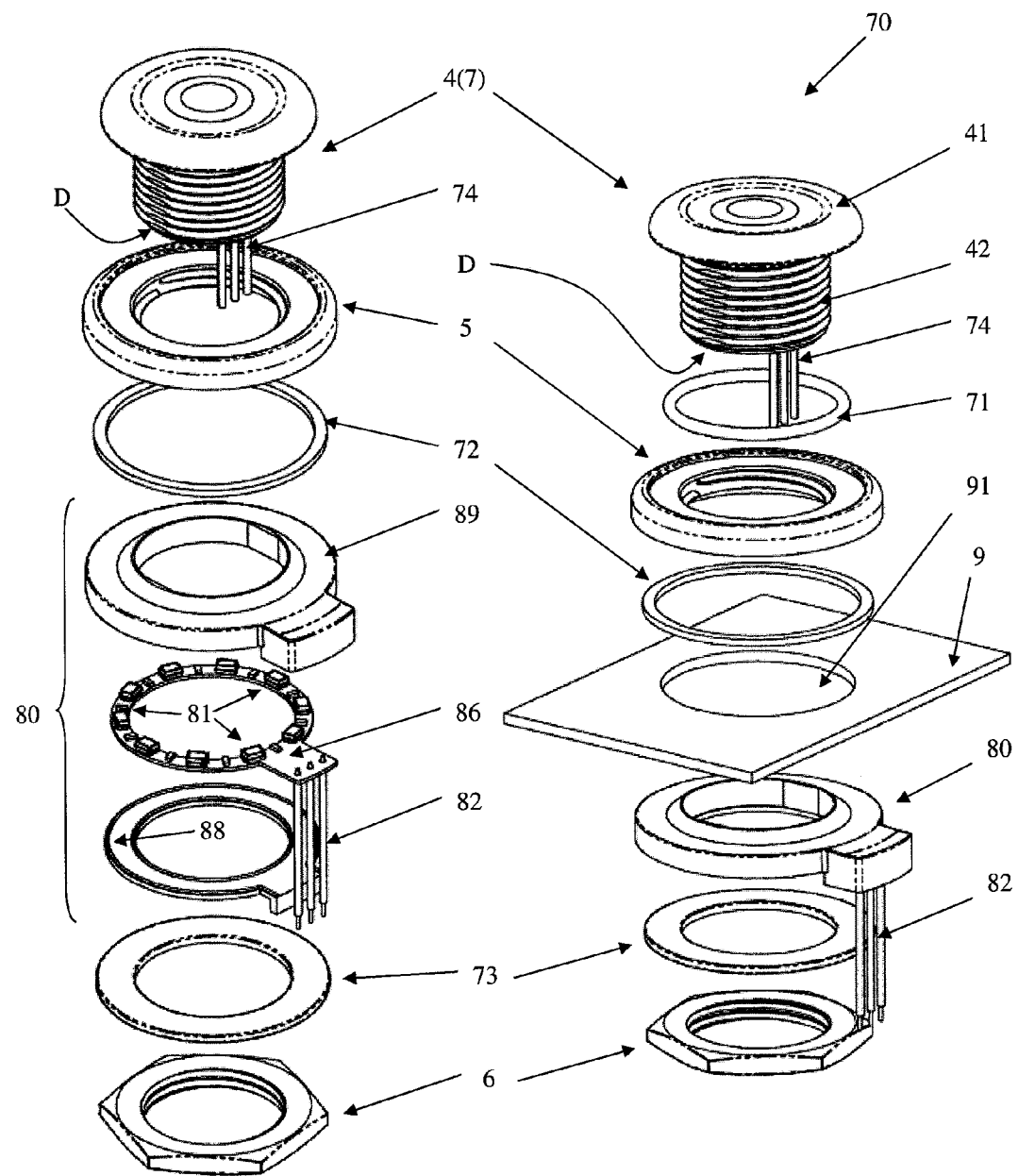
FIG. 7A FIG. 7B

FASTENER WITH ILLUMINATOR

RELATED APPLICATIONS

The present application is a continuation-in-part of U.S. patent application Ser. No. 12/258,528 filed Oct. 27, 2008 which is based on, and claims priority from, Taiwanese Application Number 96218757, filed Nov. 7, 2007. The disclosures of all above-listed applications are hereby incorporated by reference herein in their entirety.

TECHNICAL FIELD

The present disclosure generally relates to a fastener with an illuminator, and particularly, to a structure that simplifies conversion of a fastener that originally contains no light source into one that contains a light source and that realizes a substantial reduction of costs.

RELATED ART

A conventional fastening device, such as a threadedly fixed switch and a threaded fastening element for jointing plates, provides a fastening function. Taking the threadedly fixed switch as an example, the threadedly fixed switch can be a warning switch that contains a light source or one that contains no light source. The no-light-source switch 1, as shown in FIG. 1, comprises at least a main body 11 and a threaded securing member 12. Inside the main body 11, a switch assembly 13 is received and retained. A front portion of the main body 11 is diverged to form a top retention portion 111 from a rear side of which a threaded section 112 extends. The threaded section 112 functions to form a threading engagement with the threaded securing member 12. As shown in FIG. 2, with the threaded section 112 of the main body 11 fit into a mounting hole 21 defined in a mounting plate 2 and further with the threaded securing member 12 engaging the threaded section 112 of the main body 11, abutting engagement is established by the top retention portion 111 of the main body 11 and the threaded securing member 12 so as to securely fix the switch 1 on the mounting plate 2.

However, in certain applications where the no-light-source switch 1 is required to additionally include a light source for warning or indication purposes, the no-light-source switch 1 has to be completely removed and replaced with a switch that contains a light source. This inevitably increases the costs of switch replacement. Thus, it is a challenge of the industry to realize the desired warning or indication light source through a simple structural conversion effected on the switch 1 that originally contains no light source.

SUMMARY

In an aspect, a fastener comprises a main body comprising a front portion and a rear portion, a securing member engageable with the rear portion of the main body, and a light source unit securable between the securing member and the front portion of the main body, for providing light to illuminate the front portion of the main body.

In another aspect, a kit is provided for converting a non-illuminated fastener into an illuminated one. The fastener includes a main body having a front portion and a rear portion, and a securing member engageable with the rear portion of the main body. The kit comprises a light source unit and a light guide. The light source unit is adapted to be arranged between the securing member and the front portion of the main body, for providing light to illuminate the front portion of the main body. The light guide is adapted to be arranged between the front portion of the main body and the light source unit, for guiding light generated from the light source unit toward the front portion of the main body.

In a further aspect, an assembled structure comprises a support, a main body, a light source unit, a light guide, and a securing member. The support has a hole therein. The main body comprises a front portion on a first side of the support, and a rear portion extending from the front portion through the hole to an opposite, second side of the support. The light source unit is fit over the rear portion of the main body, and comprises at least one light emitting unit for emitting light toward the front portion of the main body. The light guide is fit over the rear portion of the main body and positioned between the front portion of the main body and the light source unit. The light guide comprises a light emission portion on the first side of the support, and a light guide portion facing the at least one light emitting unit for receiving and guiding light emitted by the at least one light emitting unit to the light emission portion for illuminating the front portion of the main body or a vicinity thereof. The securing member is engaged with the rear portion of the main body to secure the main body on the support, with the light source unit and the light guide being positioned between the securing member and the front portion of the main body.

BRIEF DESCRIPTION OF THE DRAWINGS

Throughout the specification and drawings identical or similar reference numerals refer to identical or similar parts.

DETAILED DESCRIPTION

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

In order to overcome the problems associated with high costs and complication of the conventional way for conversion of a fastener that contains no light source into one that contains a light source, one or more embodiments provide a fastener with an illuminator, wherein, by modifying a threaded securing member of a light source unit and optionally adding a light guide, a fastener that originally contains no light source can be converted into one that contains a light source in a simplified manner at low cost.

Figure 1:
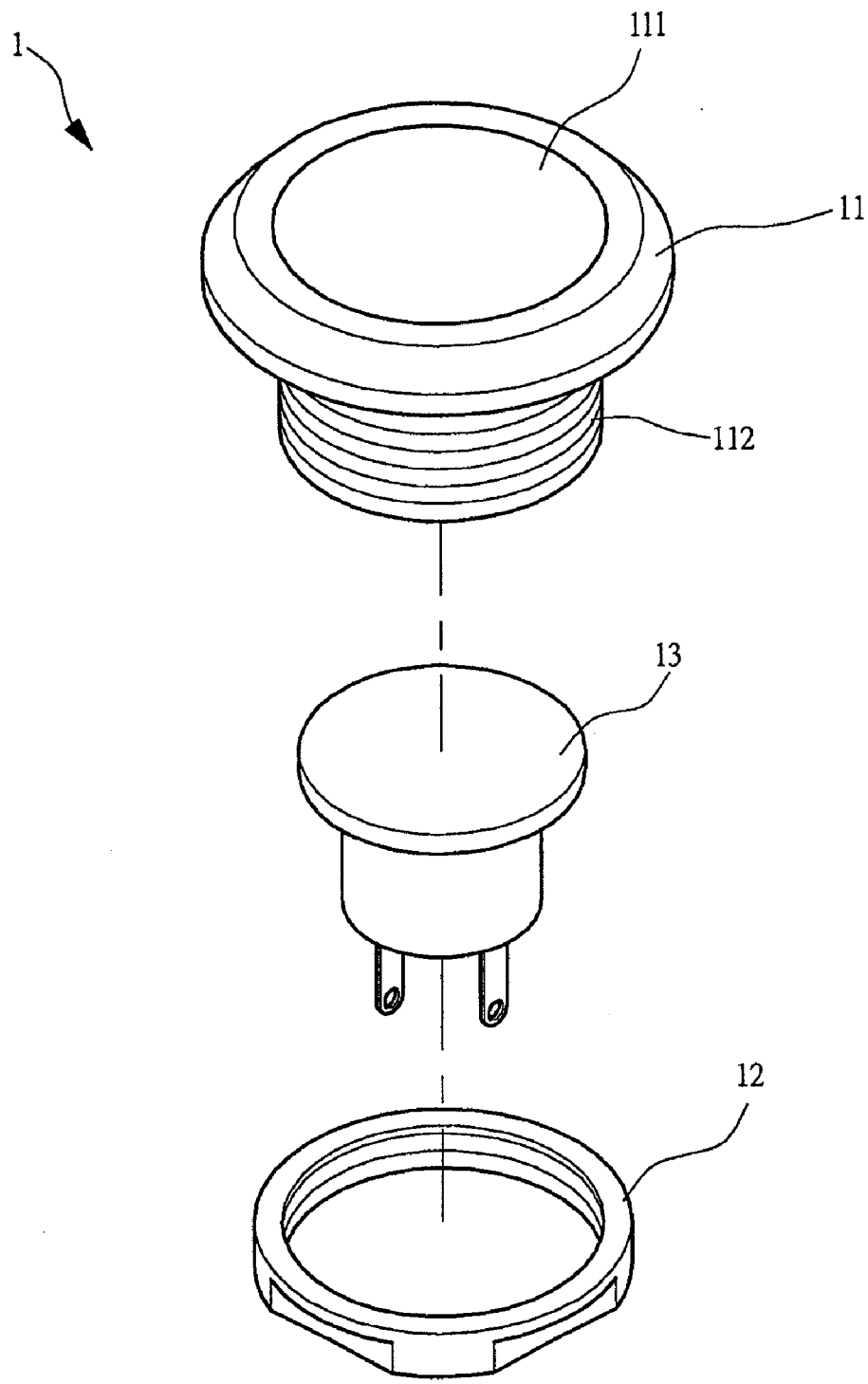
FIG. 1 is an exploded view of a conventional no-light-source switch.
Figure 2:
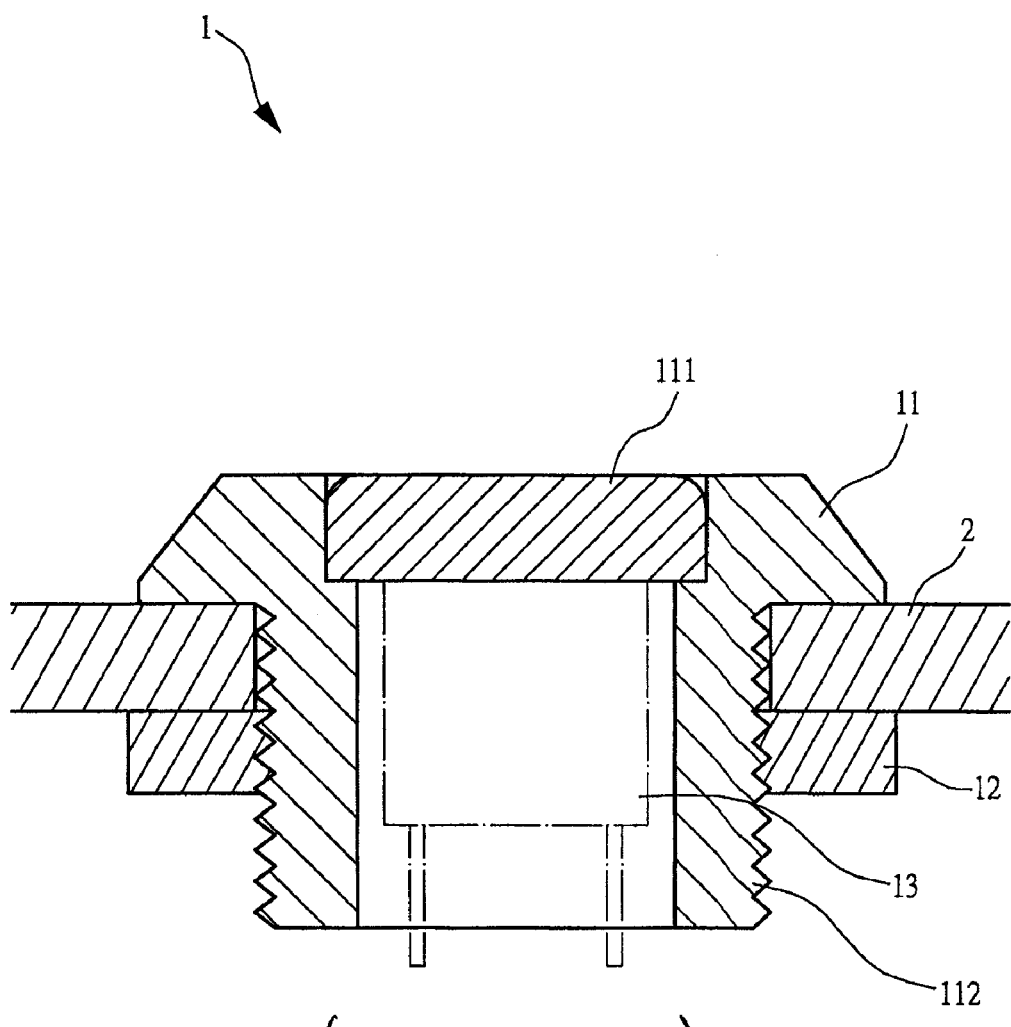
FIG. 2 is a cross-sectional view schematically illustrating an application of the conventional no-light-source switch.
Figure 3:
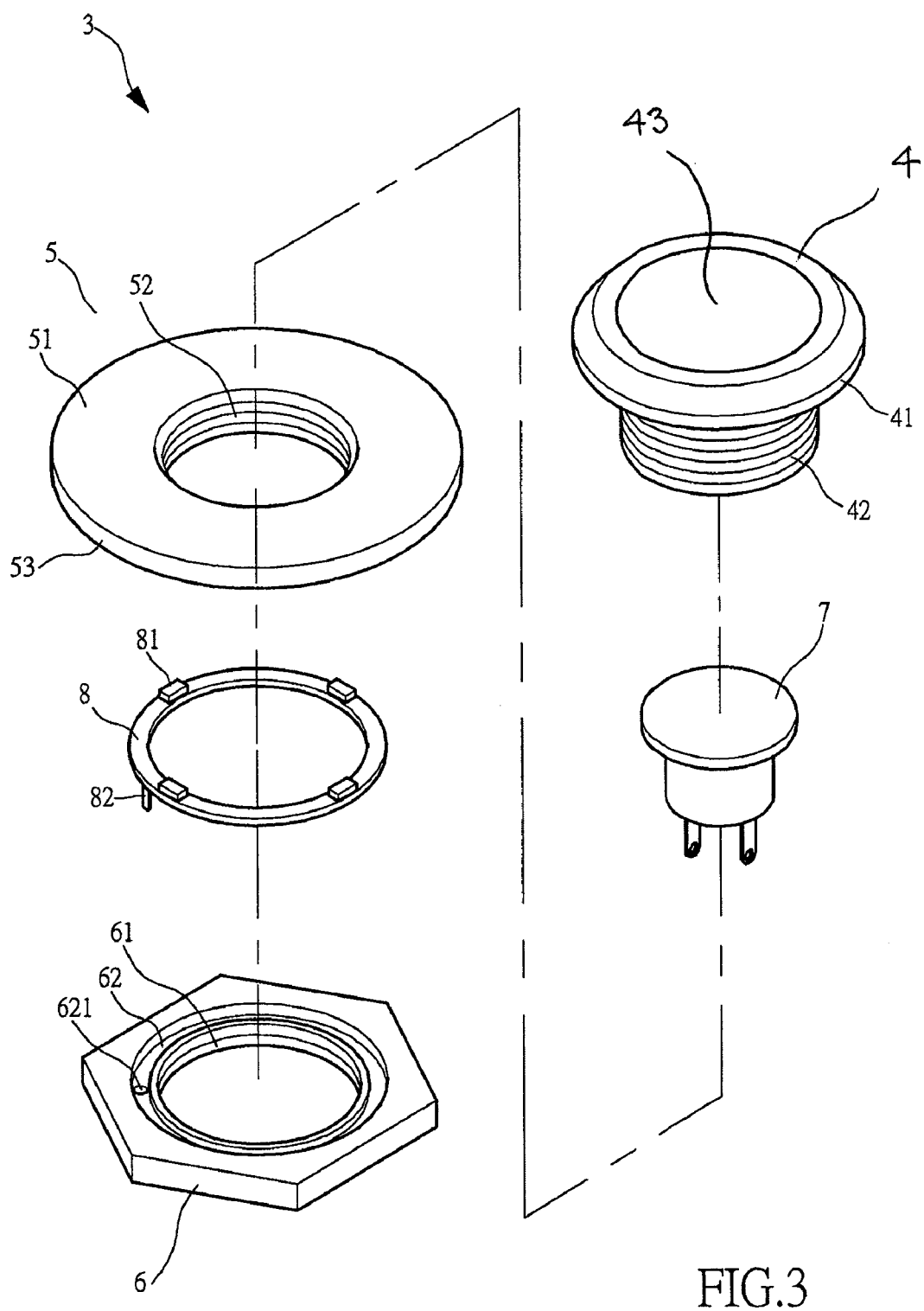
FIG. 3 is an exploded view of a fastener with an illuminator in accordance with one or more embodiments of the present invention.

With initial reference to FIG. 3, a fastener in accordance with one or more embodiments of the present invention, generally designated at 3, comprises a main body 4, a light guide 5, and a threaded securing member 6.

The main body 4 has a top end forming a top retention portion or a head 41. The main body 4 has a rear portion extending from the top retention portion 41 and forming a threaded section 42. The main body 4 has a cavity 43 that allows arrangement of a switch assembly 7 therein.

The light guide 5 has a top portion forming a platen-like light emission portion 51. The light emission portion 51 forms a bore 52 in a central portion thereof. A lower edge of the bore 52 extends downward to form a light guide portion 53. In some embodiments, the light guide 5 is a translucent diffuser.

The threaded securing member 6 forms in a central portion thereof a through hole 61. A circumferential groove 62 is formed adjacent and around the through hole 61. The groove 62 receives a light source unit 8 therein. The light source unit 8 comprises at least one light emitting unit or illuminator. In the particularly illustrated embodiment, the light source unit 8 includes a plurality of illuminators 81, which can be embodied as light-emitting diodes (LEDs). A lead passage 621 is defined through a bottom of the groove 62. The lead passage 621 allows the extension of power terminals 82 of the light source unit 8.

Figure 4:
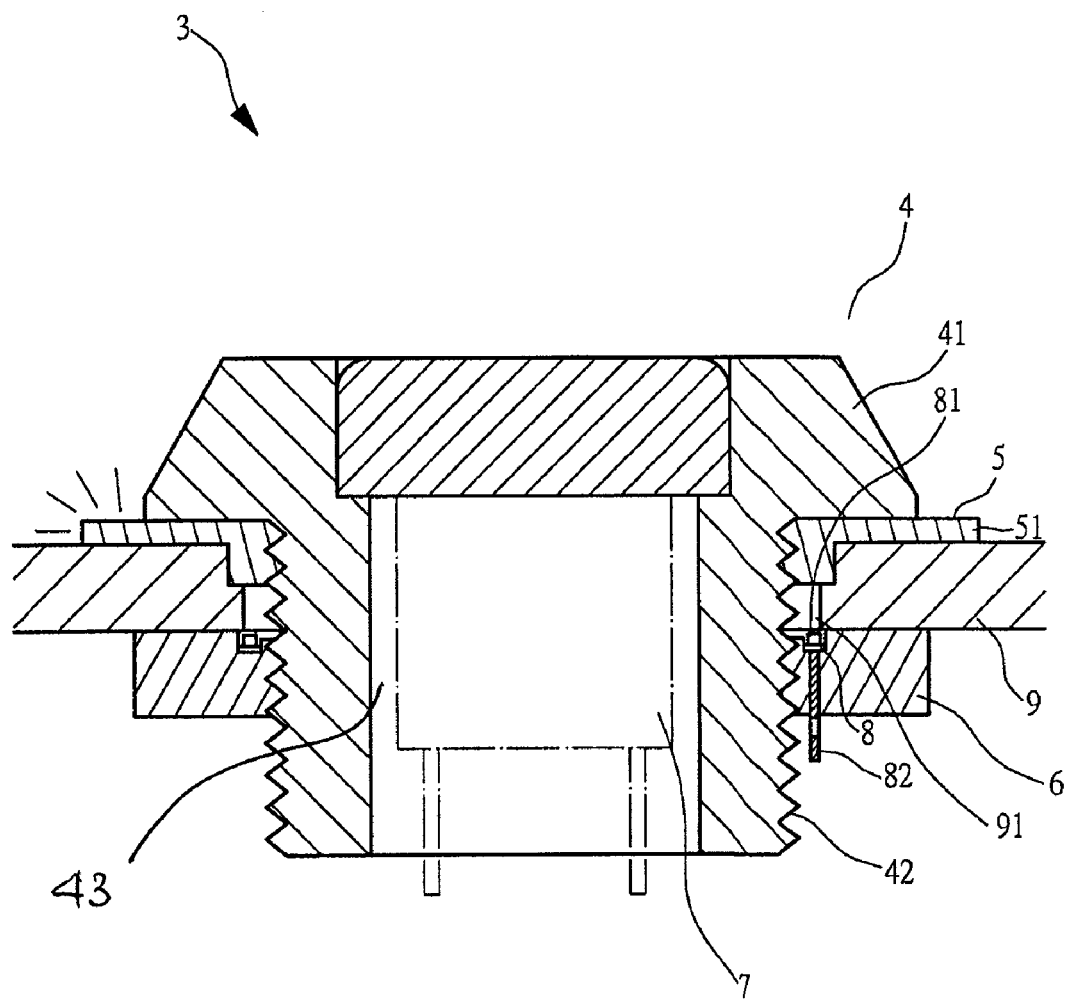
FIG. 4 is a cross-sectional view of the fastener of FIG. 3 in an assembled form.

In use, as shown in FIG. 4, the light guide 5 is first fit over the main body 4 that receives the switch assembly 7 therein. Then, the main body 4, together with the light guide 5, is fit through a mounting hole 91 defined in a mounting board (or any type of support) 9. Thereafter, the threaded securing member 6 threadedly engages the threaded section 42 of the main body 4, whereby with the tight retention engagement realized through the top retention portion 41 of the main body 4 and the threaded securing member 6, the main body 4 is securely fixed to the mounting hole 91 of the mounting board 9. As such, with the light source unit 8 that is arranged in the threaded securing member 6 being connected to a power source, the illuminators 81 of the light source unit 8 are lit and give off light. The light from the light source unit 8 is guided by the light guide 5 so that the light emission portion 51 of the light guide 5 illuminates. Thus, the top portion of the main body 4 may serve as a lighting or illuminating ring for warning or indication purposes.

Thus, when a switch 1 that does not contain a light source needs a warning or indication lighting ring due to the requirement of applications, it only needs to replace a conventional threaded securing member 12 of the switch 1 with the threaded securing member 6 that contains the light source unit 8 and to further add the light guide 5 so that the switch 1 that originally contains no light source is added with a lighting ring for warning or indication purposes. Such an arrangement realizes a simple conversion of a no-light-source switch 1 into one that contains a light source.

Figure 5:
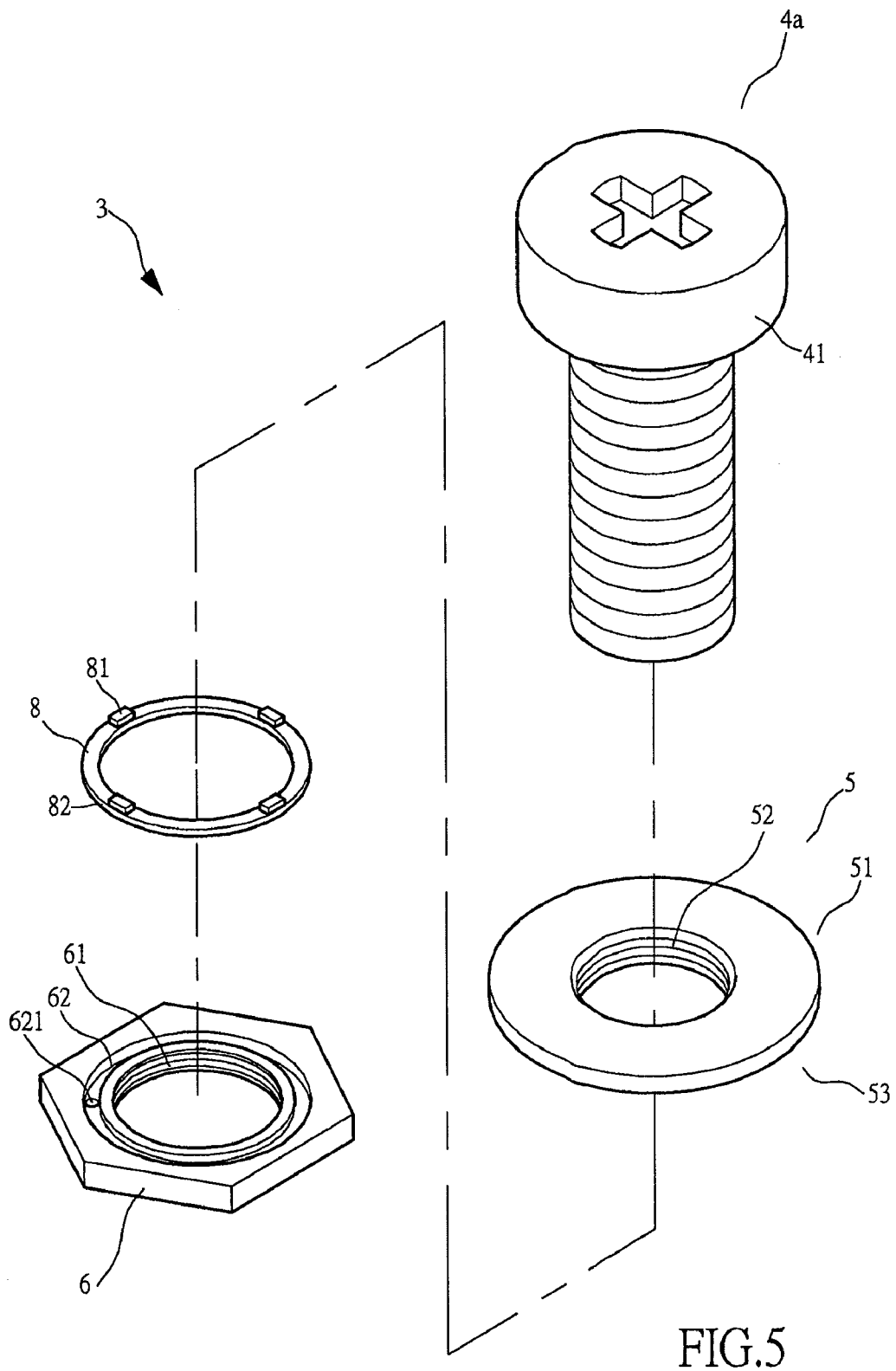
FIG. 5 is an exploded view of a fastener with an illuminator in accordance with another embodiment of the present invention.
Figure 6:
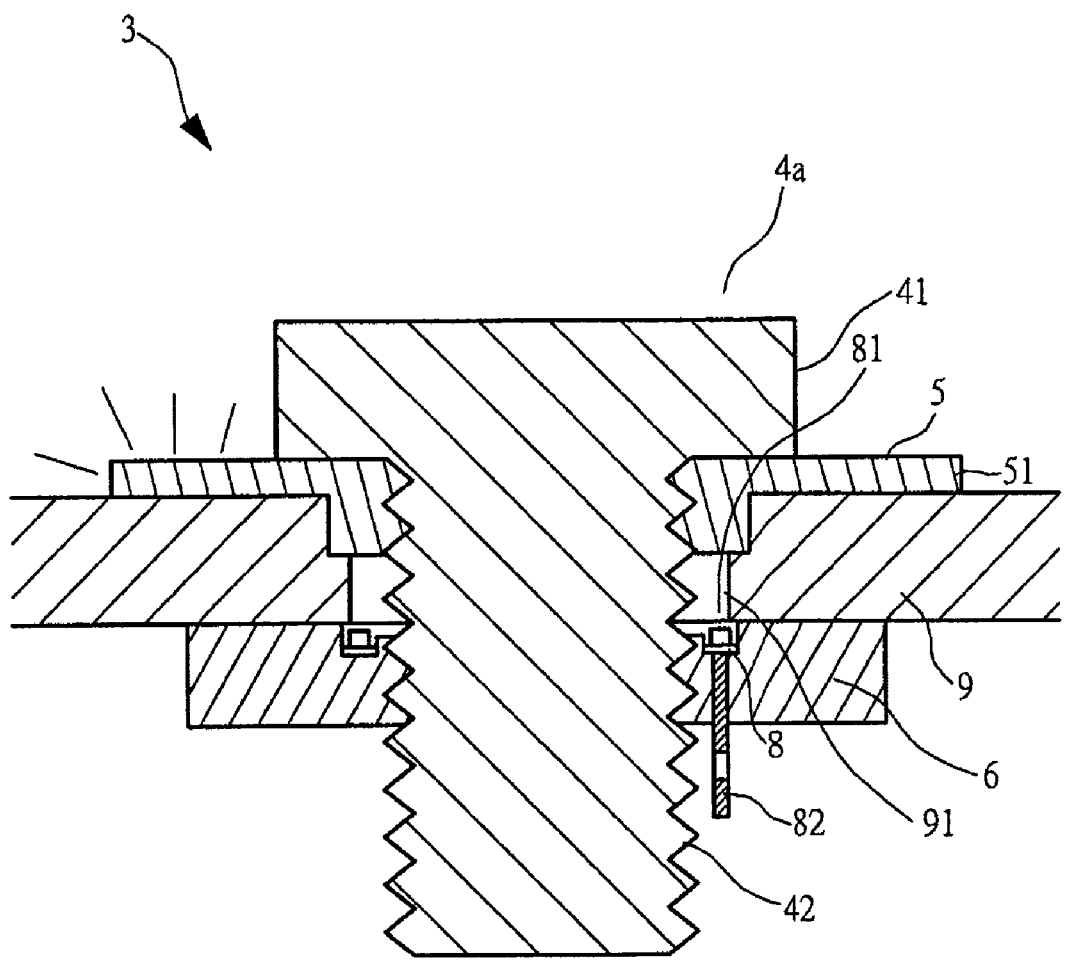
FIG. 6 is a cross-sectional view of the fastener of FIG. 5 in an assembled form.

When the fastener 3 is a simple fastening device that contains no switch assembly 7, as shown in FIGS. 5 and 6, the light guide 5 is first fit onto the main body 4a and the main body 4a, together with the light guide 5, is then into the mounting hole 91 of the mounting board 9. The threaded securing member 6 is set in threading engagement with the threaded section 42 of the main body 4a, whereby with abutting engagement realized through the top retention portion 41 of the main body 4a and the threaded securing member 6, the main body 4a is now securely fixed to the mounting hole 91 of the mounting board 9. As such, with the light source unit 8 that is arranged in the threaded securing member 6 being connected to a power source, the illuminators 81 of the light source unit 8 are lit and give off light. The light from the light source unit 8 is guided by the light guide 5 so that the light emission portion 51 of the light guide 5 illuminates. Thus, the top portion of the main body 4 may serve as a lighting or illuminating ring for warning or indication purposes. With such a structural arrangement, similarly, for a conventional fastener that does not contain a light source but needs a warning or indication lighting ring, it is only needed to replace a conventional threaded securing member 12 of the conventional fastener with the threaded securing member 6 that contains the light source unit 8 and to further add the light guide 5 so that the conventional fastener can be provided with a lighting ring for warning or indication purposes. With such an arrangement, a simple conversion of a no-light-source fastener into one that contains a light source can be realized.

In one or more embodiments, the light guide 5 can be omitted. For example, if the top retention portion (front portion) 41 of the main body 4 and/or the mounting board 9 to which the fastener 3 is fastened is transparent, light emitted from the light source unit 8 can directly reach the front portion 41 of the main body 4.

In one or more embodiments, the main body 4 and the securing member 6 can engage each other via means other than threads, such as, but not limited to, by friction fit, snap fit, bayonet lock, adhesive, magnetic and/or electrostatic attraction etc. Any means that can attach, either permanently or releasably, the main body and the securing member can be used.

In some embodiments, the light guide 5 is engageable to the rear portion 42 of the main body 4 by the same as or different means than the attachment between the rear portion 42 and the securing member 6. In the embodiment particularly illustrated in FIGS. 3-4, the bore 52 of the light guide 5 has an internal thread engageable with the external thread of the rear portion 42. In further embodiments, the light guide 5 is not positively engaged with the rear portion 42, and is simply clamped between the front portion 41 and the mounting board 9.

In one or more embodiments, the switch assembly 7 can be replaced with any electrical component(s) that need(s) to be illuminated. In some embodiments, the switch assembly 7 can be replaced with one or more non-electrical elements such as a cover and/or a seal for closing off the cavity 43. In further embodiments, the switch assembly 7 is an integral part of the main body 4. In other words, the main body 4 is itself a switch having a lower portion 42 engageable, e.g., by threads, with the securing member 6 for securing the switch to the mounting board 9.

In one or more embodiments, a kit for converting a non-illuminated component (e.g., switch 7/main body 4) into an illuminated one includes at least a light source unit (e.g., light source unit 8), a light guide (e.g., light guide), and a replacement securing member (e.g., securing member 6) as disclosed herein. The replacement securing member, e.g., a brass nut, is machined to form a groove (e.g., groove 62) which allows clearance for receiving the entire light source unit The light source unit is an LED ring which comprises a Printed Circuit Board (PCB—unnumbered) containing at least one LED thereon. Light is transmitted upward through a hole (e.g., hole 91) in a panel (e.g., mounting board or support 9) to the light guide, which is a clear diffuser mounted around the switch.

In some embodiments, the kit further includes an o-ring (not shown) and/or a gasket (not shown). The switch is sealed to the diffuser by the o-ring positioned between the head of the switch and the diffuser. The diffuser is further sealed to the panel via the gasket positioned between the diffuser and the panel. When an o-ring is originally provided with the switch, the kit additionally includes only the gasket.

Figure 7C:
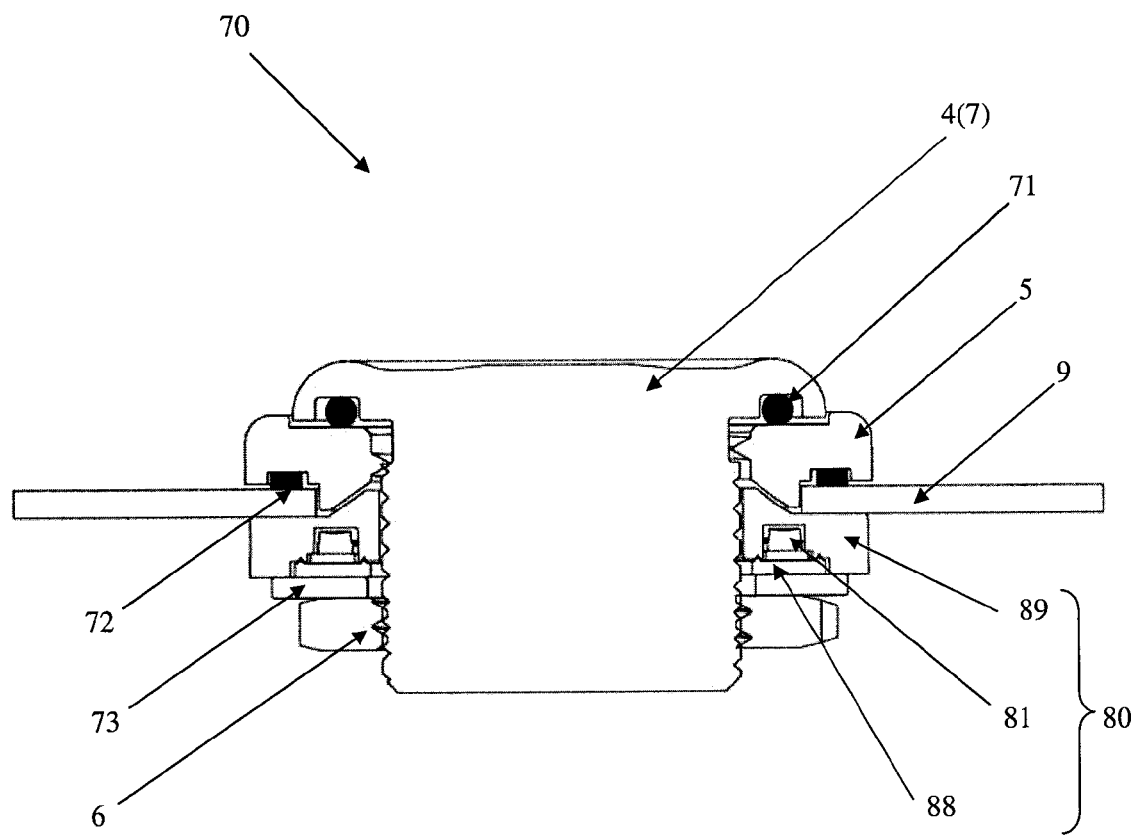
FIG. 7 is an exploded perspective view of a structure in accordance with one or more embodiments.
Figure 8:
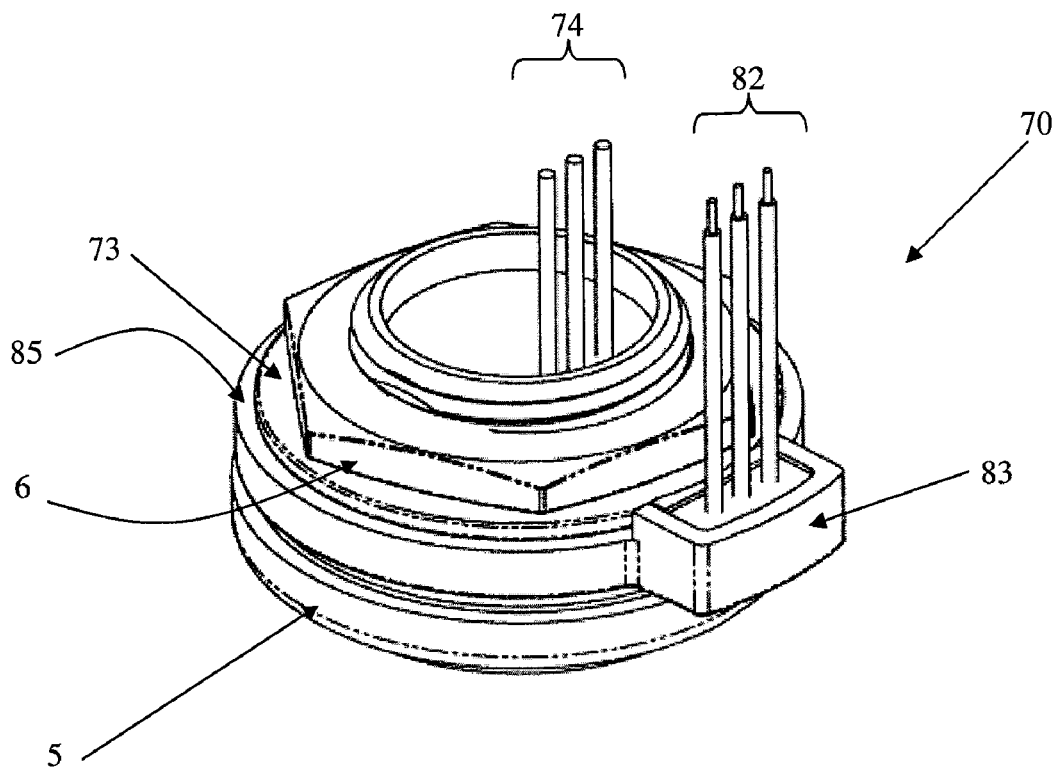
FIG. 8 is a bottom perspective view of the structure of FIG. 7 in an assembled state.
Figure 9:
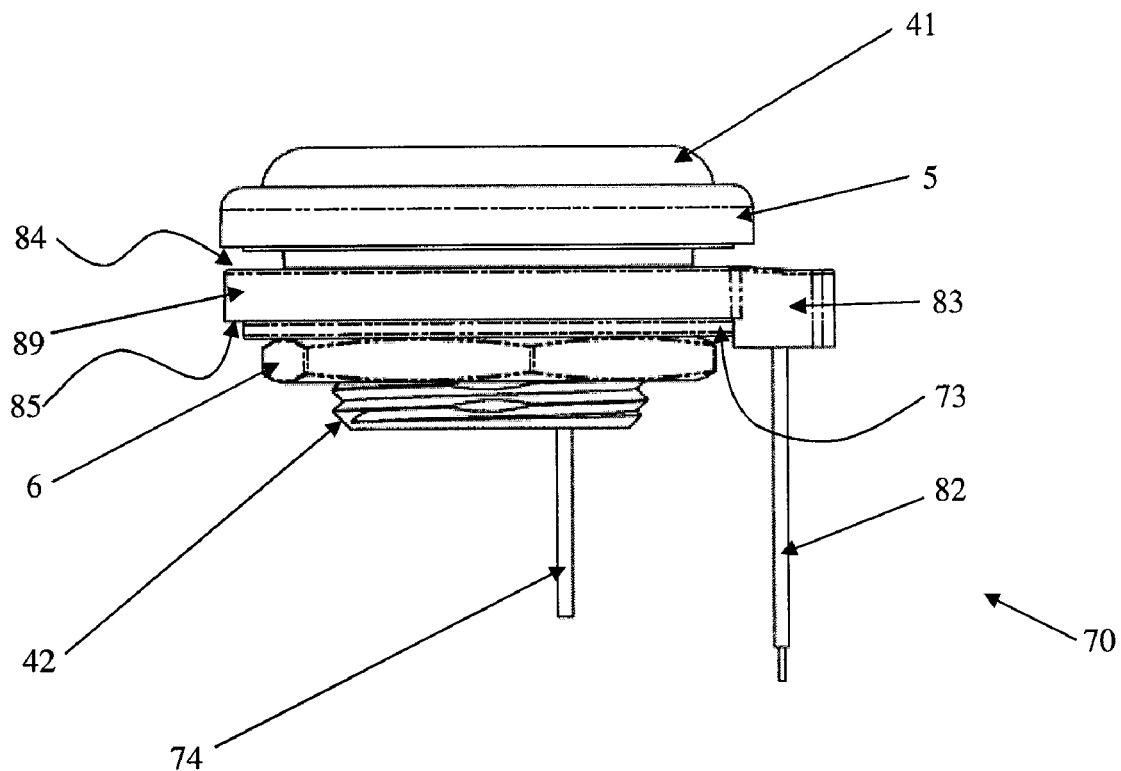
FIG. 9 is a schematic side view of the assembled structure of FIG. 8.

FIG. 7 is an exploded perspective view of a structure 70 in accordance with one or more embodiments. FIG. 8 is a bottom perspective view of the structure 70 in an assembled state. FIG. 9 is schematic side view of the assembled structure 70 of FIG. 8.

The assembled structure 70, as best seen in FIG. 9, is similar to that disclosed with respect to FIG. 4, except that the light source unit 8 is replaced with a light source unit 80 which is configured as a washer, rather than being accommodated in a groove of the securing member 6 like the light source unit 8. The light source unit 80 includes a base (not numbered) which is, in some embodiments, a PCB, and on which one or more light emitting units 81, e.g., LEDs (best seen in FIG. 7), are supported. A clear protective cover 89, such as a transparent encapsulant, is formed over to protect the LEDs 81. The protective cover 89 and/or the base define opposite surfaces 84, 85 of the light source unit 80. Like the end faces of a washer, the opposite surfaces 84, 85 of the light source unit 80 are subject compressive load that occurs when the securing member 6 is fastened, e.g., screwed, on the rear portion 42 of the main body 4 which, in the particularly illustrated embodiment, consists of a switch. To uniformly distribute such load across the area of the washer or light source unit 80, a regular washer 73, e.g., a metal washer, is provided in some embodiments between the securing member 6 and the light source unit 80.

A portion 83 is provided off-center with respect to and on a circumference of the light source unit 80. The portion 83 houses a circuit for controlling and/or powering the LEDs 81. One or more terminals 82 extend from the circuit to make connection with external devices. Likewise, terminals 74 extend from the switch 7 to make connection with external devices.

The structure 70 is assembled in the following exemplary manner. First, an o-ring 71 is slid onto the rear portion 42 of the switch 7 until the o-ring 71 is placed into a groove (not shown) of the switch 7. Next, the light guide 5 (e.g., a transparent diffuser) is threaded onto the rear portion 42 of the switch 7. Then, a gasket 72 is slid onto the rear portion 42 of the switch 7 to be placed on the light guide 5. Subsequently, the rear portion 42 of the switch 7 with the o-ring 71, light guide 5 and gasket 72 thereon is inserted through the hole 91 in the panel 9. Next, the light source unit 80 is slid from the other side of the panel 9 onto the rear portion 42 of the switch 7. In some embodiments, the light source unit 80 is keyed to the rear portion 42 of the switch 7, e.g., by a flat portion (not shown) on the rear portion 42, to prevent the light source unit 80 from rotating. Then, the washer 73 and the securing member 6 are slid onto the rear portion of the switch 7 and the securing member 6 is tightened to the required torque, e.g., for sealing the switch 7 to the light guide 5, and the light guide 5 to the panel 9.

In some embodiment, one or more of the o-ring 71, the light guide 5, the gasket 72, and the washer 73 can be omitted.

Figure 10:
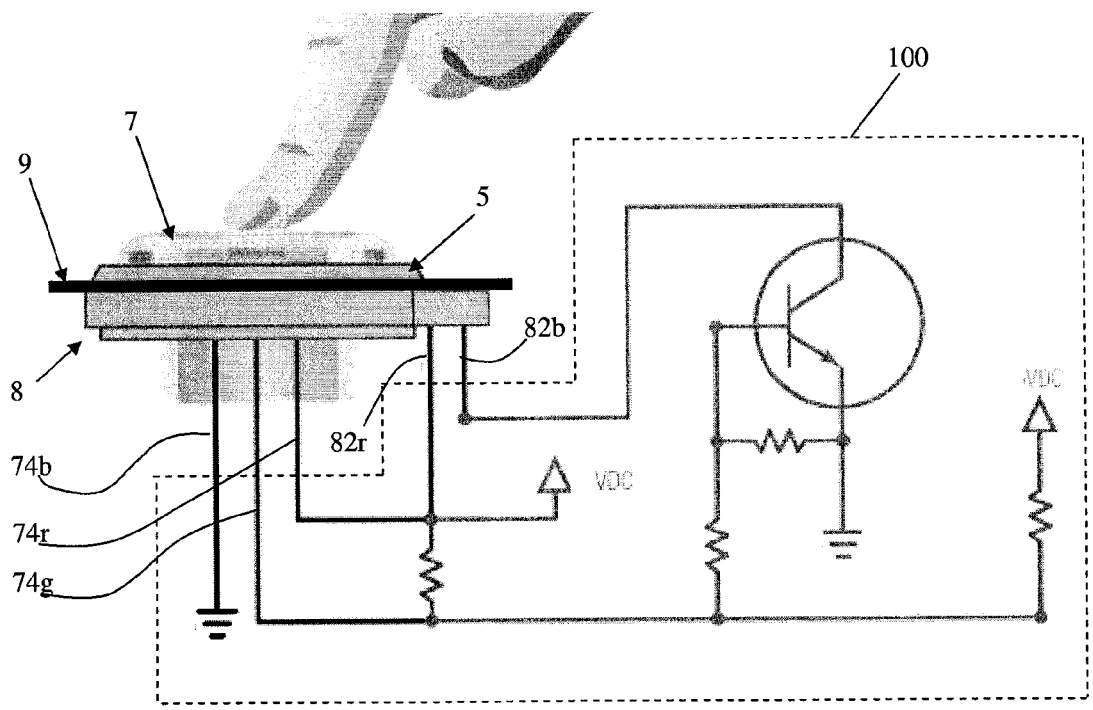
FIG. 10 is an exemplary electrical diagram of a switch and a light source unit in an assembled structure in accordance with one or more embodiments.

FIG. 10 is an exemplary electrical diagram of the switch 7 and the light source unit 80 in accordance with one or more embodiments. The electrical diagram is also applicable to connect the switch 7 and the light source unit 8. As seen in FIG. 10, the terminals 82 of the light source unit 80 (e.g., terminals 82r, 82b) and the terminals 74 of the switch 7 (e.g., terminals 74b, 74r and 74g) are connected together and to a circuit 100 which can be entirely or partially external to or incorporated in the switch 7 and/or the light source unit 80, depending on the applications. In the particularly illustrated embodiment, the terminals 82r and 74r are power terminals commonly connected to a power source, e.g., VDC. The terminal 74b is grounded. The terminal 74g is a signal terminal that indicates whether the switch 7 is closed or open. The terminal 82b is pulled to ground by a transistor T when an appropriate signal is supplied to the gate of the transistor T from the signal terminal 74g. When the terminal 82b is grounded, the LEDs 81 (not shown in FIG. 10) are lit. The particularly illustrated embodiment includes a normally open switch 7, and the LEDs 81 of the light source unit 80 are OFF when the switch 7 is activated (closed) and ON when the switch 7 is open. Other arrangements are within the scope of this disclosure.

In some embodiments, the LEDs 81 include LEDs of more than one colors to provide different indicative signals depending on the applications.

In some embodiments, a kit for converting a non-illuminated component (e.g., switch 7/main body 4) into an illuminated one includes the light source unit 80. In further embodiments, the light guide 5 is also included in such kit In yet further embodiments, the kit also includes the gasket 72 and/or the regular washer 73.

At least some embodiments disclosed with respect to FIGS. 7-9 can be implemented at lower cost than at least some embodiments disclosed with respect to FIGS. 4-6, at least because no nut machining or replacement securing member is required and the regular securing member 6 originally shipped with the switch 7 can be retained to convert the originally non-illuminated structure into an illuminated one.

Manufacturability is also increased. Particularly, since the size of the light source unit 80 is not limited to be fit in a groove of the securing member 6, the design rules are more relaxed.

Finally, since the light source unit 80 is not housed in a groove of the securing member 6, it is not rotated with the securing member 6 when the latter is fastened onto the main body 4. As a result, the terminals or wires 82 for powering and/or controlling the LEDs 81 are unlikely to be twisted as the securing member 6 (e.g., a nut) is threaded on the rear portion 41 of the main body 4 (e.g., a switch).

However, since the thickness of the light source unit 80 is added to the overall thickness of the assembled structure (e.g., structure 70), the maximum panel thickness that the assembly can be used with is decreased. Thus, at least some embodiments disclosed with respect to FIGS. 4-6 are more compact and provide greater flexibility that at least some embodiments disclosed with respect to FIGS. 7-9.

In summary, while the disclosed embodiments perform similar functions, some embodiments might have advantages over the others, and vice versa.

Unless otherwise specified, any features of any embodiment are applicable to any other embodiments.

The invention claimed is:
1. A fastener, comprising:
a main body comprising a front portion and a rear portion,
a securing member engageable with the rear portion of the main body,
a light source unit securable between the securing member and the front portion of the main body, for providing light to illuminate the front portion of the main body, and a light guide separate from the main body and securable between the front portion of the main body and the light source unit, for guiding light generated from the light source unit toward the front portion of the main body,
wherein the light guide is configured to extend outwardly and beyond an outermost periphery of the front portion of the main body when the light guide is secured between the front portion and the light source unit.

2. The fastener according to claim 1, wherein:
the light guide is annular for forming a lighting ring around the periphery of the front portion of the main body.

3. The fastener according to claim 1, wherein the light guide comprises
a light guide portion adapted to face the light source unit for receiving light emitted by the light source unit; and
a light emission portion arrangeable adjacent the periphery of the front portion of the main body for illuminating at least the periphery of the front portion of the main body with the received light.

4. The fastener according to claim 1, wherein
the light guide is directly engageable with the rear portion of the main body.

5. The fastener according to claim 1, wherein
the main body contains a switch assembly therein.

6. The fastener according to claim 1, wherein the light source unit comprises
an annular base fittable over the rear portion of the main body; and
at least one light emitting unit on the base.

7. The fastener according to claim 1, wherein the securing member includes a groove in which the light source unit is receivable.

8. The fastener according to claim 7, wherein
the securing member further includes a lead passage extending through a bottom of the groove for wiring of the light source unit received in the groove of the securing member.

9. The fastener according to claim 1, wherein
the light source unit is configured as a washer.

10. A kit for converting a non-illuminated component into an illuminated one, wherein the component includes a main body having a front portion and a rear portion, and a securing member engageable with the rear portion of the main body, the kit comprising:
a light source unit adapted to be arranged between the securing member and the front portion of the main body, for providing light to illuminate the front portion of the main body; and
a light guide adapted to be arranged between the front portion of the main body and the light source unit, and to extend outwardly and beyond a periphery of the front portion of the main body when the light guide is secured between the front portion and the light source unit, for guiding light generated from the light source unit radially outwardly and toward outward beyond an outermost periphery of the front portion of the main body.

11. The kit according to claim 10, wherein:
the light guide is annular for forming a lighting ring around the periphery of the front portion of the main body.

12. The kit according to claim 10, wherein the light source unit comprises
an annular base fittable over the rear portion of the main body; and
at least one light emitting unit on the base.

13. The kit according to claim 10, further comprising
a replacement securing member engageable with the rear portion of the main body, for replacing the securing member;
wherein the replacement securing member includes a groove in which the light source unit is receivable.

14. The kit according to claim 13, wherein
the light source unit comprises at least one light emitting unit and a circuit for controlling or powering the at least one light emitting unit; and
the entire light source unit, including the light emitting unit and the circuit, is receivable in the groove of the replacement securing member.

15. The kit according to claim 12, wherein the light source unit is configured as a washer and includes
a circuit for controlling or powering the at least one light emitting unit, the circuit being positioned off-center on a circumference of the annular base.

16. The kit according to claim 15, further comprising
a further washer adapted to be positioned between the securing member and the light source unit for distributing compressive load, which occurs across the light source unit when the securing member is engaged with the rear portion of the main body with the further washer sandwiched between the light source unit and the securing member.

17. An assembled structure, comprising:
a support having a hole therein;
a main body comprising
a front portion on a first side of the support, and
a rear portion extending from the front portion through the hole to an opposite, second side of the support;
a light source unit fit over the rear portion of the main body and comprising at least one light emitting unit for emitting light toward the front portion of the main body;
a light guide fit over the rear portion of the main body, positioned between the front portion of the main body and the light source unit, and comprising
a light emission portion on the first side of the support, and
a light guide portion facing the at least one light emitting unit for receiving and guiding light emitted by the at least one light emitting unit to the light emission portion for illuminating the front portion of the main body or a vicinity thereof; and
a securing member engaged with the rear portion of the main body to secure the main body on the support, with the light source unit and the light guide being positioned between the securing member and the front portion of the main body,
wherein the light emission portion directly rests on the support at the first side.

18. The assembled structure according to claim 17, wherein
the securing member includes a groove in which the light source unit is completely received without being subject to compressive load caused by the engagement between the securing member and the rear portion of the main body.

19. An assembled structure, comprising:
a support having a hole therein;
a main body comprising
a front portion on a first side of the support, and
a rear portion extending from the front portion through the hole to an opposite, second side of the support;
a light source unit fit over the rear portion of the main body and comprising at least one light emitting unit for emitting light toward the front portion of the main body;

a light guide fit over the rear portion of the main body, positioned between the front portion of the main body and the light source unit, and comprising
    a light emission portion on the first side of the support, and
    a light guide portion facing the at least one light emitting unit for receiving and guiding light emitted by the at least one light emitting unit to the light emission portion for illuminating the front portion of the main body or a vicinity thereof; and
a securing member engaged with the rear portion of the main body to secure the main body on the support, with the light source unit and the light guide being positioned between the securing member and the front portion of the main body, wherein
the light source unit is configured as a washer positioned between the second side of the support and the securing member and subject at least partially to compressive load caused by the engagement between the securing member and the rear portion of the main body.

20. An assembled structure, comprising:
a support having a hole therein;
a main body comprising
    a front portion on a first side of the support, and
    a rear portion extending from the front portion through the hole to an opposite, second side of the support;
a light source unit fit over the rear portion of the main body and comprising at least one light emitting unit for emitting light toward the front portion of the main body;
a light guide fit over the rear portion of the main body, positioned between the front portion of the main body and the light source unit, and comprising
    a light emission portion on the first side of the support, and
    a light guide portion facing the at least one light emitting unit for receiving and guiding light emitted by the at least one light emitting unit to the light emission portion for illuminating the front portion of the main body or a vicinity thereof; and
a securing member engaged with the rear portion of the main body to secure the main body on the support, with the light source unit and the light guide being positioned between the securing member and the front portion of the main body,
wherein the light guide is compressed between the support and a peripheral portion of the front portion of the main body, and
wherein the light guide extends outwardly and beyond the periphery portion of the front portion.

21. The assembled structure according to claim 17, wherein the light guide is separable from the main body.

* * * * *